United States Patent [19]
Ando

[11] Patent Number: 5,418,569
[45] Date of Patent: May 23, 1995

[54] METHOD AND APPARATUS FOR PREDICTIVE CODING OF MOVING IMAGES WHILE ADAPTIVELY CHANGING THE METHOD IN ACCORDANCE WITH THEM

[75] Inventor: Ichiro Ando, Yokosuka, Japan

[73] Assignee: Victor Company of Japan, Ltd., Yokohama, Japan

[21] Appl. No.: 73,906

[22] Filed: Jun. 9, 1993

[30] Foreign Application Priority Data

Jun. 10, 1992 [JP] Japan .................. 4-176167

[51] Int. Cl.$^6$ .............................................. H04N 7/32
[52] U.S. Cl. ..................... 348/405; 348/415
[58] Field of Search ................. 358/133, 136; H04N 7/137; 348/401, 405, 409, 410, 411, 412, 415

[56] References Cited

U.S. PATENT DOCUMENTS

| | | | |
|---|---|---|---|
| 4,849,810 | 7/1989 | Ericsson | 358/133 |
| 4,999,704 | 3/1991 | Ando | 348/401 |
| 5,040,061 | 8/1991 | Yonemitsu | 348/401 |
| 5,105,271 | 4/1992 | Niihara | 358/133 |
| 5,113,255 | 5/1992 | Nagata et al. | 358/136 |
| 5,150,209 | 9/1992 | Baker et al. | 358/136 |
| 5,155,594 | 10/1992 | Bernstein et al. | 358/136 |

FOREIGN PATENT DOCUMENTS 3216089 9/1991 Japan .
3252284 11/1991 Japan .

*Primary Examiner*—Tommy P. Chin
*Assistant Examiner*—Richard Lee
*Attorney, Agent, or Firm*—Lowe, Price, LeBlanc & Becker

[57] ABSTRACT

A method for predictive coding of moving images consists of the steps of calculating preliminary prediction errors of an original group of frames of moving images, accumulating the preliminary prediction errors to obtain an accumulated value, omitting one or more frames from the original group of frames to produce a decimated group of frames of moving images in cases where the accumulated value is larger than a modified order threshold value $Th_2$, weighting quantization weighting factors in cases where the accumulated value is larger than a decimated order threshold value $TH_3$, calculating prediction errors of the decimated group of frames, quantizing the prediction errors with the quantization weighting factors, encoding the prediction errors to produce pieces of output data of which each are composed of a plurality of codes. The amount of the codes of the output data is lower than an upper limit, and the decimated group of frames of moving images is distinctly reproduced by decoding the codes of the output data.

13 Claims, 6 Drawing Sheets

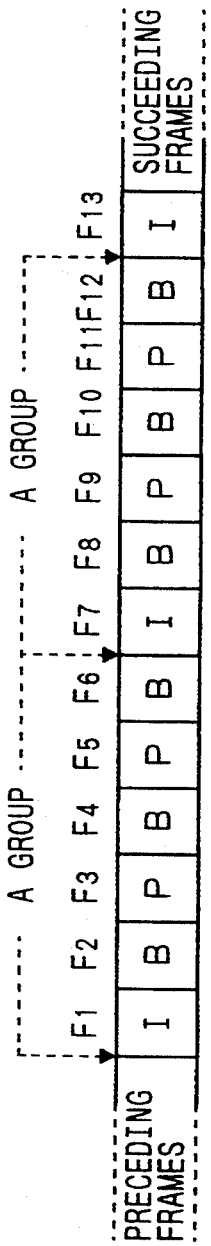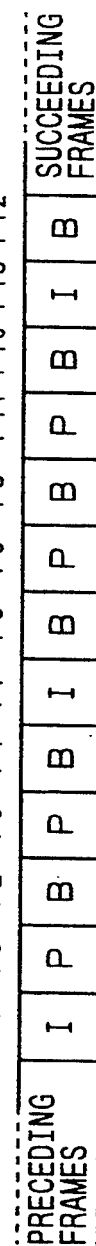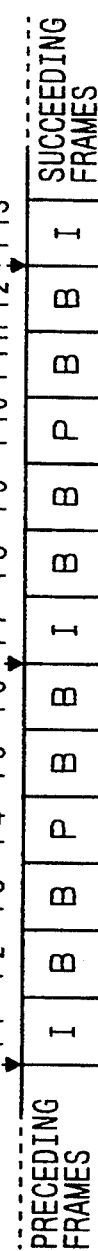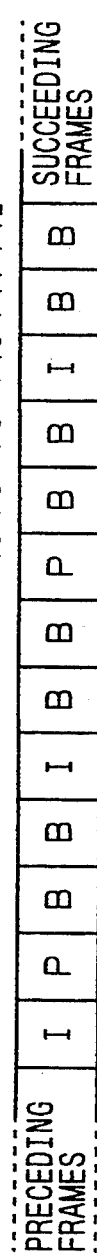
FIG. 4A ORIGINAL ORDER
FIG. 4B PROCESSING ORDER
FIG. 4C MODIFIED ORDER
FIG. 4D MODIFIED PROCESSING ORDER

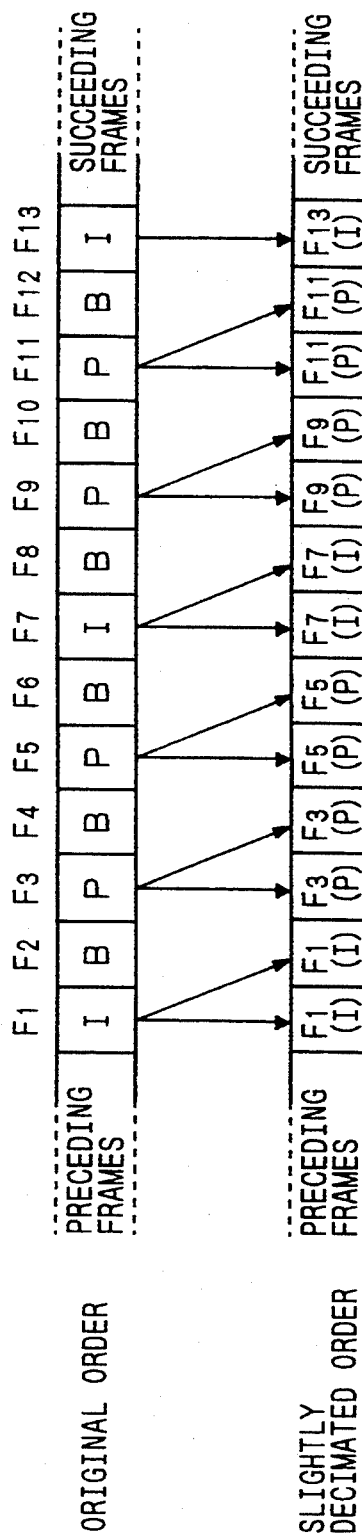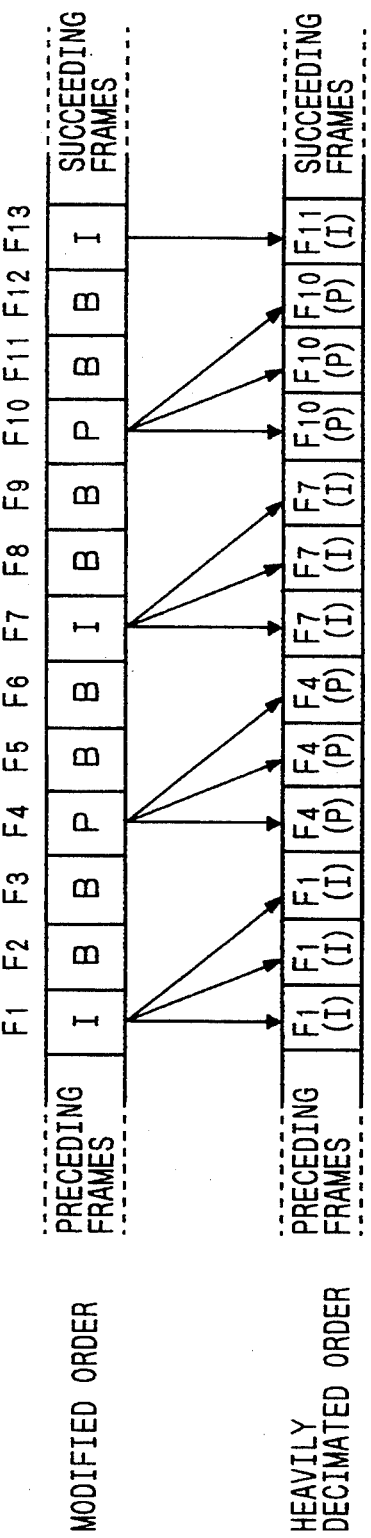

FIG. 7A

NON-WEIGHTED MATRIX

```
DIRECT            16  16  16  16  16  16  16  16
CURRENT           16  16  16  16  16  16  16  16
ELEMENT           16  16  16  16  16  16  16  16
                  16  16  16  16  16  16  16  16
                  16  16  16  16  16  16  16  16
                  16  16  16  16  16  16  16  16
                  16  16  16  16  16  16  16  16
                  16  16  16  16  16  16  16 (16)
                                            MAXIMUM FREQUENCY
                                            ELEMENT
```

FIG. 7B

WEIGHTED MATRIX

```
DIRECT          (16) 17  18  19  20  21  22  23
CURRENT          17  18  19  20  21  22  23  24
ELEMENT          18  19  20  21  22  23  24  25
                 19  20  21  22  23  24  25  26
                 20  21  22  23  24  25  26  27
                 21  22  23  24  25  26  27  28
                 22  23  24  25  26  27  28  29
                 23  24  25  26  27  28  29 (30)
                                            MAXIMUM FREQUENCY
                                            ELEMENT
```

FIG. 8

| ORIGINAL OR MODIFIED ORDER | PRECEDING FRAMES | F1 | F2 | F3 | F4 | F5 | F6 | F7 | F8 | F9 | F10 | F11 | F12 | SUCCEEDING ORDER |
|---|---|---|---|---|---|---|---|---|---|---|---|---|---|---|
| DIRECTLY DECIMATED ORDER | PRECEDING FRAMES | F1 | X | F3 | X | F5 | X | F7 | X | F9 | X | F11 | X | SUCCEEDING ORDER |

METHOD AND APPARATUS FOR PREDICTIVE CODING OF MOVING IMAGES WHILE ADAPTIVELY CHANGING THE METHOD IN ACCORDANCE WITH THEM

BACKGROUND OF THE INVENTION

1. Field of the Invention

The present invention relates generally to a method and an apparatus for an inter-frame predictive coding of moving images, and more particularly to a method and an apparatus for efficiently encoding where the coding method changes in accordance with inter-frame prediction errors derived from a group of frames before encoding those frames.

2. Description of the Related Art

For designing a coding system for moving images, it is desirable to reduce amount of codes generated in the coding system. For this purpose, an interframe predictive coding is widely used in the coding systems. In these systems, image data of a current frame are predicted from that of a reference frame, and differences between them are encoded. The differences are generally called prediction errors. When the image data of the current frame are exactly predicted, the amount of codes are effectively suppressed. Therefore, it is important to select a suitable reference frame from frames being adjacent to the current frame. Applying motion compensation to prediction procedure is effective for reducing the amount of codes. In this case, motion vectors obtained from positional differences between the image data of the current frame and that of the reference frame, are used for compensating the prediction errors.

In above mentioned operation, the image data are divided into many blocks composed of a predetermined number of pixels (for example, 8×8 pixels) and are processed block by block. Thereafter, the prediction errors are discrete cosine transformed, quantized, and encoded into a variable length code.

FIG. 1 shows a series of frames for illustrating how to predict a current frame in an inter-frame predictive coding.

As shown in FIG. 1, an X-frame is not predicted with any frame and is encoded independently. In this case, the amount of codes $Ci$ obtained by actually encoding the I-frame is quite large.

A P-frame is predicted with a preceding frame, and prediction errors in the present frame are calculated. The prediction errors in the present frame are defined as differences between image data of the present frame predicted and that of the present frame actually inputted. Thereafter, the prediction errors are encoded. In this case, the amount of codes $Cp$ obtained by encoding the prediction errors are smaller than the amount of codes obtained by encoding the present frame independently.

A B-frame in the drawing predicted with a preceding P-frame or I-frame. First prediction errors between a current B-frame and a preceding P-frame or I-frame and second prediction errors between a current B-frame and a succeeding P-frame or I-frame are compared, and then, lesser ones are selected by the block from them and are encoded. As a result of this prediction errors selection, the amount of codes of B-frame ($Cb$) is more reduced.

A current B-frame is generally predicted with both a preceding P-frame or I-frame and a succeeding P-frame or I-frame of which the frames are respectively nearest to the current B-frame. Also, the amount of codes $Cp$ relating to the P-frame, the amount of codes $Cb$ relating to the B-frame, and the amount of codes $Ci$ relating to the I-frame generally satisfy an relationship $Ci > Cp > Cb$.

Therefore, in cases where a series of frames is encoded, a plurality of B-frames and a plurality of P-frames are set between a pair of I-frames to reduce the total amount of codes $Ct$ obtained by summing them.

In addition, an adaptive inter-frame prediction method in which the number of P-frames or B-frames positioned between the I-frames is adjusted in connection with the sum of the prediction errors in those P-frames or/and B-frames calculated before encoding has been proposed in U.S. Pat. No. 5,105,271.

2.1. PREVIOUSLY PROPOSED ART

A block diagram of a conventional inter-frame predictive coding apparatus opened in Japan Patent Application H3-252284 is described with reference to FIG. 2.

Referring to FIG. 2, input image data of successive frames are fed to a code-amount predictive device 11 and a prefilter 12 having a variable pass band via a motion compensator 13 composed of motion compensator and a prediction error generator. The input image data may be directly fed to the code-amount predictive device 11 and the prefilter 12. The code-amount predictive device 11 predicts the amount of codes on the basis of frame activity derived from the input image data, determines a band limiting value and a quantization step size in response to the predicted amount of codes, and outputs data of the determined band limiting value and the determined quantization step size to prefilter 12 and a quantizer 14 respectively.

The motion compensator calculates motion vectors between the image data of a current frame and that of a reference frame and outputs to the code-amount predictive device 11. The prediction error generator in the motion compensator 13 calculates prediction errors between the current frame and the reference frame, compensates them with the motion vectors, and outputs to the prefilter 12.

The prefilter 12 varies the pass band for the prediction errors in response to the band limiting value fed from the code-amount predictive device 11. The prediction errors from the prefilter 12 are fed to a discrete cosine transforming device 15. The prediction errors are transformed into transformed coefficients and fed to the quantizer 14. The quantizer 14 quantizes the transformed coefficients with the quantization step size fed from code-amount predictive device 11. Quantized output from the quantizer 14 are converted by the encoder 16 into given-format code such as Huffman code. The output coded data from the encoder 16 are transmitted, or recorded into a recording medium.

The code-amount predictive device 11 predicts the amount of codes in coding processes from the activity. Where the activity is large, the code-amount predictive device 11 controls the quantizer 14 and the prefilter 12 by the quantization step size and the band limiting value respectively, and then, the amount of codes is suppressed effectively.

2.2. PROBLEMS TO BE SOLVED BY THE INVENTION

However, in cases where parts of data elements in each of the prediction errors are relinquished, each frame of moving image cannot be distinctly reproduced because details of the image are neglected. Specifically, in cases where a fine pattern is gradually changed in a series of frames, the activity detected in the code-amount predictive device 11 is considerably increased, and a narrow pass-band and a coarse quantization step occur consequently. Therefore, the reproductivity of the details in the image considerably deteriorates. For example, in cases where a caption is inserted in the moving image in which a fine pattern in the image is gradually changed in a series of frames, a lot of average motion data are relinquished because the amount of codes predicted in the code-amount predictive device 11 is considerably increased. As a result, a viewer cannot distinguish contents of the caption.

SUMMARY OF THE INVENTION

A first object of the present invention is to provide, with due consideration to the drawbacks of such a conventional method for encoding prediction errors of moving images while reducing the amount of codes obtained by encoding the prediction errors, a method for encoding a plurality of prediction errors of frames while reducing, if necessary, the amount of codes obtained by encoding the prediction errors of the frames of moving images.

A second object is to provide a moving image encoding apparatus in which a plurality of prediction errors are encoded according to the above method while reducing, if necessary, the amount of codes obtained by encoding the prediction errors.

The first object is achieved by the provision of a method for encoding a plurality of prediction errors of a group of frames, comprising the steps of:

calculating preliminary prediction errors of an original group of frames arranged in original order, a frame of moving image existing in each of the frames, and each of the preliminary prediction errors being defined as a difference between a frame of moving image actually produced and a frame of moving image predicted;

accumulating the preliminary prediction errors of the original group of frames to obtain an accumulated value;

omitting one or more frames from the original group of frames to produce a decimated group of frames in cases where the accumulated value is larger than a modifed order threshold value $TH_2$; calculating prediction errors of the decimated group of frames arranged in decimated order, each of the prediction errors of the decimated group of frames being defined as a difference between a frame of moving image actually produced and a frame of moving image predicted, and a second accumulated value of the prediction errors of the decimated group of frames being smaller than the modified order threshold value $Th_2$; and encoding the prediction errors of the decimated group of frames to produce pieces of output data of which each are composed of a plurality of codes, the amount of the codes of the output data being lower than an upper limit, and the decimated group of frames of moving images being reproduced by decoding the codes of the output data.

In the above steps, in cases where an accumulated value of preliminary prediction errors of an original group of frames arranged in original order is larger than a modified order threshold value $Th_2$, the original group of frames of moving images cannot be encoded because the amount of codes of pieces of output data produced by encoding the preliminary prediction errors becomes too large to encode the preliminary prediction errors in a limited size of moving image encoding system. Therefore, the compulsory reduction of the preliminary prediction errors is required to encode frames of moving images.

In a conventional method, each of the prediction errors of the original group of frames is roughly encoded to reduce the amount of codes. Therefore, each frame of moving image in the original group of frames of moving images cannot be distinctly reproduced.

Therefore, in the present invention, one or more frames in the original group of frames are omitted to reduce the amount of codes. In this case, each frame of moving image in the decimated group of frames of moving images can be distinctly reproduced. As a result, even though one or more frames are omitted from the original group of frames in which a fine pattern of moving images are gradually changed, a viewer can distinguish the fine pattern of moving images without any deterioration of the decimated group of moving images.

In detail, the accumulated value of the preliminary prediction errors of the original group of frames arranged in original order is preliminarily calculated to judge whether or not a frame omitting operation is required. In cases where the accumulated value is larger than a modified order threshold value $Th_2$, the frame omitting operation is performed. That is, one or more frames are omitted from the original group of frames, and a decimated group of frames is produced. In this case, it is predicted that prediction errors of the decimated group of frames can be encoded in the limited size of moving image encoding system because the amount of codes obtained by encoding the prediction errors of the decimated group of frames is smaller than an upper limit.

Thereafter, the prediction errors of the decimated group of frames arranged in decimated order are calculated, and the prediction errors are encoded to produce pieces of output data. Therefore, the amount of codes composing the output data becomes lower than the upper limit. That is, the decimated group of frames of moving image can be distinctly reproduced by decoding the codes of tile output data.

Also, the first object is achieved by the provision of a method for encoding a plurality of prediction errors of a group of frames, comprising the steps of: preparing an original group of frames composed of one or more I-frames, one or more P-frames, and one or more B-frames, a frame of moving image existing in each of the I-, P- and B-frames an I-frame of moving image being not predicted with any frame, a P-frame of moving image being predicted with an I-frame or another P-frame of moving image preceding the P-frame of moving image, and a B-frame of moving image being predicted with both an I-frame or a P-frame of moving image preceding the B-frame of moving image and an I-frame or a P-frame of moving image succeeding the B-frame of moving image;

preparing a modified group of frames composed of one or more I-frames, one or more P-frames, and one or more B-frames, the number of B-frames being increased while decreasing the number of P-frames as compared with the original group of frames, and the number of the modified group of frames being equal to the number of the original group of frames;

preparing a slightly decimated group of frames which is produced by slightly omitting one or more frames from the original group of frames and replacing each of the frames omitted with a frame preceding or succeeding the frames omitted;

preparing a heavily decimated group of frames which is produced by heavily omitting a plurality of frames from the modified group of frames and replacing each of the frames omitted with a frame preceding or succeeding the frames omitted;

calculating preliminary prediction errors of the original group of frames arranged in original order, each of the preliminary prediction errors being defined as a difference between a frame of moving image actually produced and a frame of moving image predicted;

accumulating the preliminary prediction errors of the original group of frames to obtain an accumulated value;

calculating first prediction errors of the original group of frames in cases where the accumulated value is smaller than a first threshold value, each of the first prediction errors of the original group of frames being defined as a difference between a frame of moving image actually produced and a frame of moving image predicted;

calculating second prediction errors of the modified group of frames in cases where the accumulated value ranges between the first threshold value and a second threshold value larger than the first threshold value, each of the second prediction errors of the modified group of frames being defined as a difference between a frame of moving image actually produced and a frame of moving image predicted;

calculating third prediction errors of the slightly decimated group of frames in cases where the accumulated value ranges between the second threshold value and a third threshold value larger than the second threshold value, each of the third prediction errors of the slightly decimated group of frames being defined as a difference between a frame of moving image actually produced and a frame of moving image predicted; calculating fourth prediction errors of the heavily decimated group of frames in cases where the accumulated value is larger than the third threshold value, each of the fourth prediction errors of the heavily decimated group of frames being defined as a difference between a frame of moving image actually produced and a frame of moving image predicted; and encoding the first prediction errors the second prediction errors, the third prediction errors or the fourth prediction errors to produce pieces of output data of which each are composed of a plurality of codes, the amount of the codes of the output data being lower than an upper limit, and one group of frames of moving images selected from among the original group of frames of moving images, the modified group of frames of moving images, the slightly decimated group of frames of moving images, and the heavily decimated group of frames of moving images being reproduced by decoding the codes of the output data.

In the above steps, because a B-frame of moving image is predicted with both a frame of moving image preceding the B-frame of moving image and a frame of moving image succeeding the B-frame of moving image, a prediction error of the B-frame is generally smaller than a prediction error of a P-frame. Therefore, the first sum of prediction errors of a modified group of frames is smaller than the second sum of prediction errors of an original group of frames.

Also, in cases where one or more frames Fo are omitted from one of groups of frames to replace each of the frames Fo omitted with a frame Fp preceding the frames Fo omitted, prediction errors of the frames Fp respectively become zero. Therefore, the third sum of prediction errors of a slightly decimated group of frames is smaller than the first sum of prediction errors of the modified group of frames. In addition, the fourth sum of prediction errors of a heavily decimated group of frames is smaller than the third sum of prediction errors of the slightly decimated group of frames.

In cases where the accumulated value is smaller than the first threshold value, prediction errors of the original group of frames can be encoded in a limited size of moving image encoding system because the amount of codes obtained by encoding the prediction errors is predicted to be sufficiently small. Therefore, the prediction errors of the original group of frames are calculated and reliably encoded to produce pieces of output data composed of codes.

In cases where the accumulated value ranges between the first threshold value and the second threshold value, prediction errors of the original group of frames cannot be encoded in the limited size of moving image encoding system because the amount of codes obtained by encoding the prediction errors is predicted to be too large. Therefore, prediction errors of the modified group of frames are calculated and reliably encoded to produce pieces of output data composed of codes.

In cases where the accumulated value ranges between the second threshold value and the third threshold value, prediction errors of the modified group of frames cannot be encoded in the system. Therefore, prediction errors of the slightly decimated group of frames are calculated and reliably encoded to produce pieces of output data composed of codes.

In cases where the accumulated value is larger than the third threshold value, prediction errors of the slightly decimated group of frames cannot be encoded in the system. Therefore, prediction errors of the heavily decimated group of frames are calculated and reliably encoded to produce pieces of output data composed of codes.

Accordingly, because the sum of prediction errors is decreased in stages in connection with the accumulated value, moving images can be reproduced as distinct as possible.

Also, the first object is achieved by the provision of a method for encoding successive frames of moving images, in which the successive frames are divided into groups consisting of a predetermined number of frames, the method comprising the step of:

calculating inter-frame prediction errors which each are derived from a difference between a current frame belonging to a current group and a reference frame adjacent to the current frame;

calculating a sum of the inter-frame prediction errors before the frames belonging to the current group are encoded;

comparing the sum of the inter-frame prediction errors with a modified order threshold level $Th_2$;

reconstituting a new current group of frames by omitting at least one frame from the current group in cases where the sum exceeds the modified order threshold level $Th_2$; and respectively encoding frames belonging to the new current group.

In the above steps, an inter-frame prediction error of each of current frames belonging to the current group is calculated. Thereafter, the sum of the inter-frame prediction errors is calculated. In cases where the sum is equal to or less than the modified order threshold level $Th_2$, current frames belonging to the current group are respectively encoded without reconstituting any new current group. In contrast, in cases where the sum exceeds the modified order threshold level $Th_2$, a new current group is reconstituted by omitting at least one frame from the current group. Therefore, the sum of inter-frame prediction errors which each are derived from a difference between a frame belonging to the new current group and a reference frame adjacent to the frame becomes equal to or less than the modified order threshold level $Th_2$. Thereafter, frames belonging to the new current group are respectively encoded.

The second object is achieved by the provision of a moving image encoding apparatus, comprising:

prediction error accumulating means for accumulating preliminary prediction errors of an original group of frames to obtain an accumulated value, a frame of moving image existing in each of the frames, and each of the preliminary prediction errors being defined as a difference between a frame of moving image actually produced and a frame of moving image predicted;

frame omitting information generating means for generating a piece of frame omitting information in cases where the accumulated value obtained in the prediction error accumulating means is larger than a modified order threshold value;

moving image memory means for storing a decimated group of frames of moving images according to the frame omitting information generated in the frame omitting information generating means, the decimated, group of frames being produced by omitting one or more frames from the original group of frames utilized in the prediction error accumulating means;

prediction error calculating means for calculating prediction errors of the decimated group of frames of moving images stored in the moving image memory means, each of the prediction errors being defined as a difference between a frame of moving image actually produced and a frame of moving image predicted; and encoding means for encoding the prediction errors of the decimated group of frames calculated in the prediction error calculating means to produce predetermining error codes, the number of predicting error codes being smaller than an upper limit, and the decimated group of frames of moving images being reproduced by decoding the predicting error codes.

In the above configuration, preliminary prediction errors of an original group of frames are preliminarily accumulated to predict the amount of codes obtained by encoding the preliminary prediction errors. That is, in cases where the accumulated value obtained by accumulating the preliminary prediction errors is larger than a modified order threshold value, the amount of codes becomes larger than an upper limit. Therefore, the preliminary prediction errors of the original group of frames cannot be encoded. In this case, a decimated group of frames of moving images is stored in the moving image memory means. Because one or more frames are omitted from the original group of frames to produce the decimated group of frames, the sum of prediction errors is smaller than the accumulated value. Therefore, it is predicted that the amount of codes obtained by encoding prediction errors of the decimated group of frames becomes smaller than the upper limit.

Thereafter, prediction errors of the decimated group of frames of moving image are calculated in the prediction error calculating means. Because the amount of codes obtained by encoding the prediction errors is smaller than the upper limit, the prediction errors are reliably encoded in the encoding means.

Accordingly, each of frames of moving images in the decimated group of frames can be distinctly reproduced by decoding the codes because no deterioration is generated in each of the frames. As a result, a viewer can enjoy the moving images clearly displayed on a display.

BRIEF DESCRIPTION OF THE DRAWINGS

The objects, features and advantages of the present invention will be apparent from the following description taken in conjunction with the accompanying drawings, in which:

FIGS. 4A, 4B, 4C, and 4D respectively show a series of frames consisting of I-frames, B-frames, and P-frames;

FIGS. 5A, 5B respectively show a series of frames decimated slightly or heavily;

FIGS. 7A, 7B respectively show an example of a matrix of $8 \times 8$ quantization weighting factors utilized for quantization performed in a quantizer shown in FIG. 3; and FIG. 8 shows a series of frames with conventional decimation.

DETAIL DESCRIPTION OF THE PREFERRED EMBODIMENTS

Preferred embodiments of a method and an apparatus for encoding image data of moving images according to the present invention are described with reference to drawings.

Figure 1:
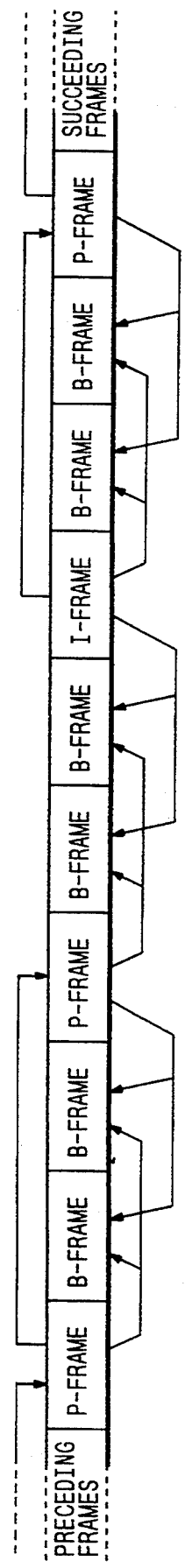
FIG. 1 shows a series of frames for illustrating how to predict a current frame in an interframe predictive coding.
Figure 2:
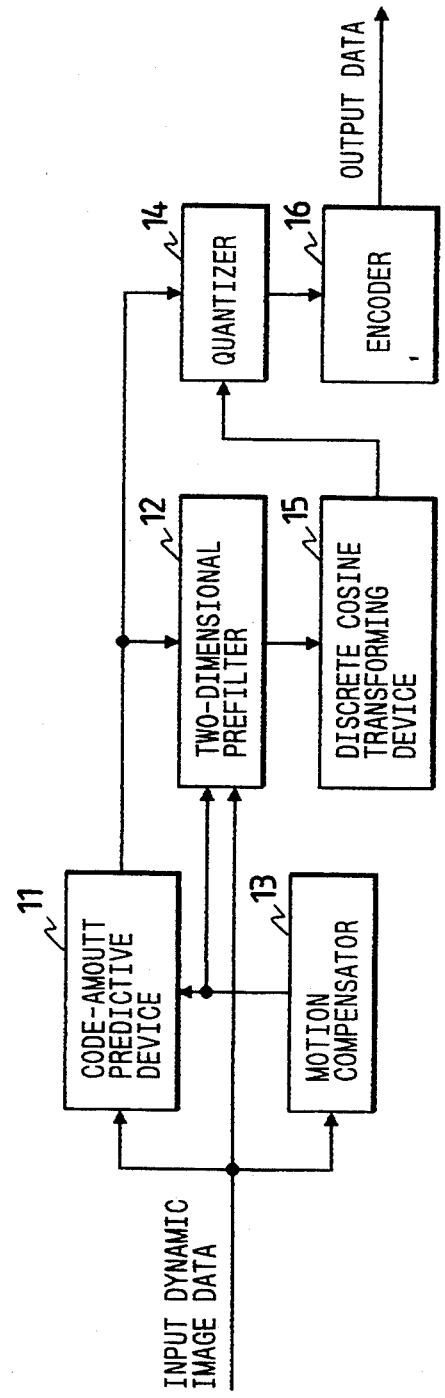
FIG. 2 is a block diagram of a conventional interframe predctive coding apparatus opened in Japan Patent Application H3-252284.
Figure 3:
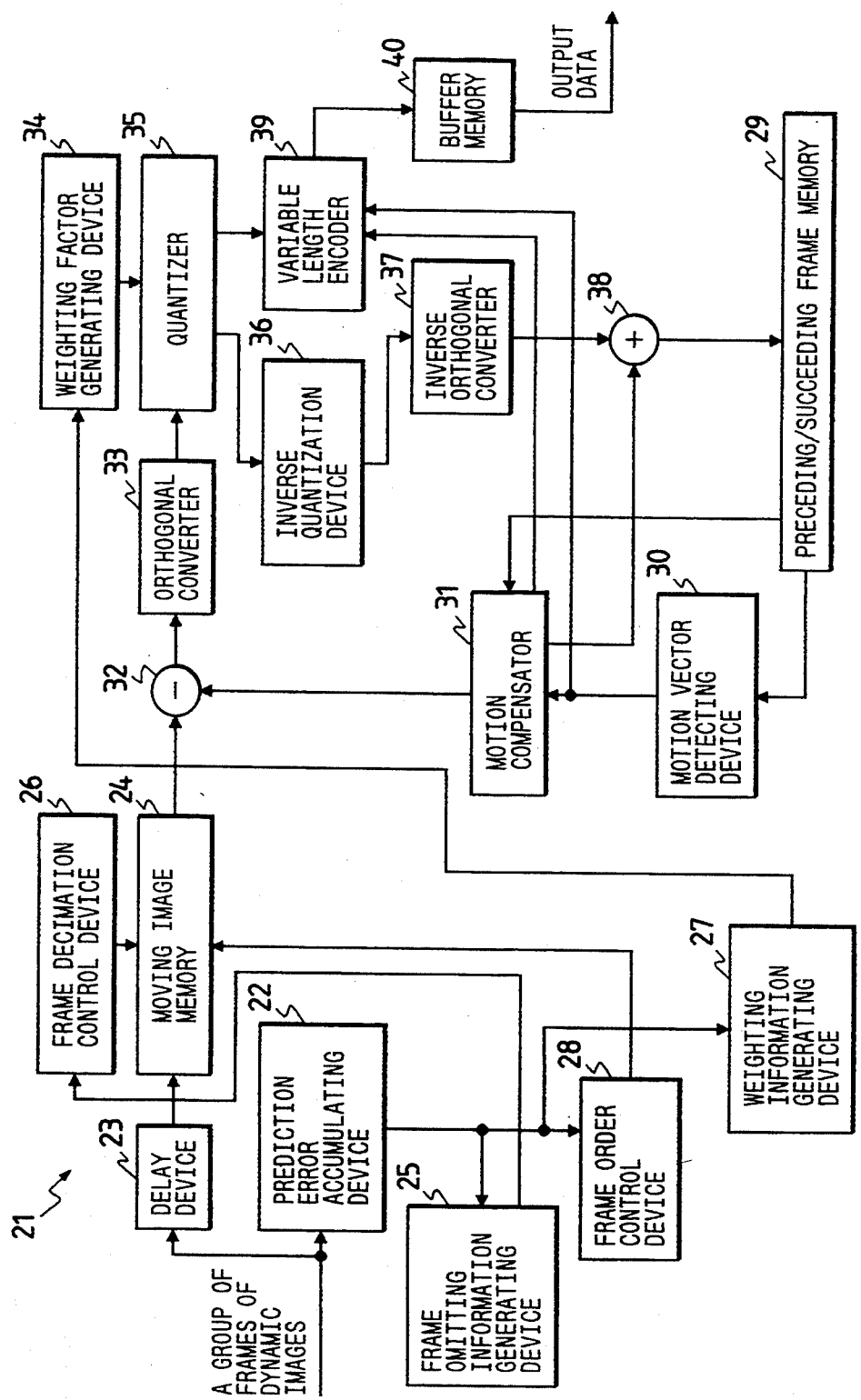
FIG. 3 is a block diagram of an image encoding apparatus according to an embodiment of the present invention.

FIG. 3 is a block diagram of an encoding apparatus according to an embodiment of the present invention.

FIGS. 4A, 4B, 4C, and 4D respectively show a series of frames consisting of I-frames, B-frames, and P-frames.

FIGS. 5A, 5B respectively show a series of frames decimated slightly or heavily. As shown in FIG. 3, an encoding apparatus 21 comprises a prediction error accumulating device 22 for accumulating prediction errors of a group of frames before encoding those frames and outputting an accumulated value Acc of the accumulated prediction errors to predict the amount of codes in actual coding, a delay device 23 for delaying frames input to the apparatus 21 until the prediction errors of the group of frames are accumulated in the prediction error accumulating device 22, a moving image memory 24 consisting of a plurality of frame memories for storing a group of frames, a frame omitting information generating device 25 for generating a piece of frame omitting information in connection with the accumulated value Acc output from the prediction error accumulating device 22 to omit one or more frames from the group of frames, a frame decimation control device 26 for controlling the decimation of the frames stored in the moving image memory 24 according to the frame omitting information generated in the frame omitting information generating device 25, a weighting information generating device 27 for generating a piece of weighting information in connection with the accumulated value Acc output from the prediction error accumulating device 22 to control the quantization of prediction errors of the frames, and a frame-order control device 28 for controlling the arrangement of frames such as I-frames, B-frames and P-frames in a group of frames controlling the processing order of the groups of frames in connection with the accumulated value Acc output from the prediction error accumulating device 22.

In the above configuration of the apparatus 21, a series of frames Fi (i=1, 2, —) of moving images arranged in original order shown in FIG. 4A is transmitted to the prediction error accumulating device 22 and the delay device 23. In the prediction error accumulating device 22, prediction errors of the frames are calculated one after another, and absolute values of the prediction errors are calculated. Thereafter, the absolute values of the prediction errors are summed to produce an accumulated value Acc for each group of frames to predict the amount of codes in actually encoding. In the first embodiment, a group of frames consists of six frames.

Thereafter, a piece of frame omitting information is generated in connection with the accumulated value Acc output from the prediction error accumulating device 22 in the frame omitting information generating device 25. Thereafter, one or more frames are omitted from the group of frames stored in the moving image memory 24, if necessary, under the control of the frame decimation control device 26 according to the frame omitting information generated in the frame omitting information generating device 25. For example, in cases where the accumulated value Ace output from the prediction error accumulating device 22 is large in some degree, each of frames $F_j$ (j is an even number) is replaced with a frame $F_{j-1}$ and these frames are stored in the moving image memory 24, as shown in FIG. 5A. Also, in cases where the accumulated value Acc is considerably large, the frames $F_2$, $F_3$, $F_5$, $F_6$, —are replaced with preceding frames $F_1$, $F_4$, —to omit the frames $F_2$, $F_3$, $F_5$, $F_6$, —, as shown in FIG. 5B. That is, a series of frames $F_i$ is heavily decimated, and the moving image data of the frames $F_i$ heavily decimated are restored in the moving image memory 24.

Also, a piece of weighting information is generated in the weighting information generating device 27 in connection with the accumulated value Acc output from the prediction error accumulating device 22 to control the quantization of prediction errors of the group of frames. In addition, the order of the frames read out from the moving image memory 24 is adjusted under the control of the frame-order control device 28. For example, in cases where a series of frames is stored in the moving image memory 24 in original order shown in FIG. 4A, the frames are read out from the moving image memory 24 in processing order shown in FIG. 4B under the control of the frame-order control device 28.

Figure 6:
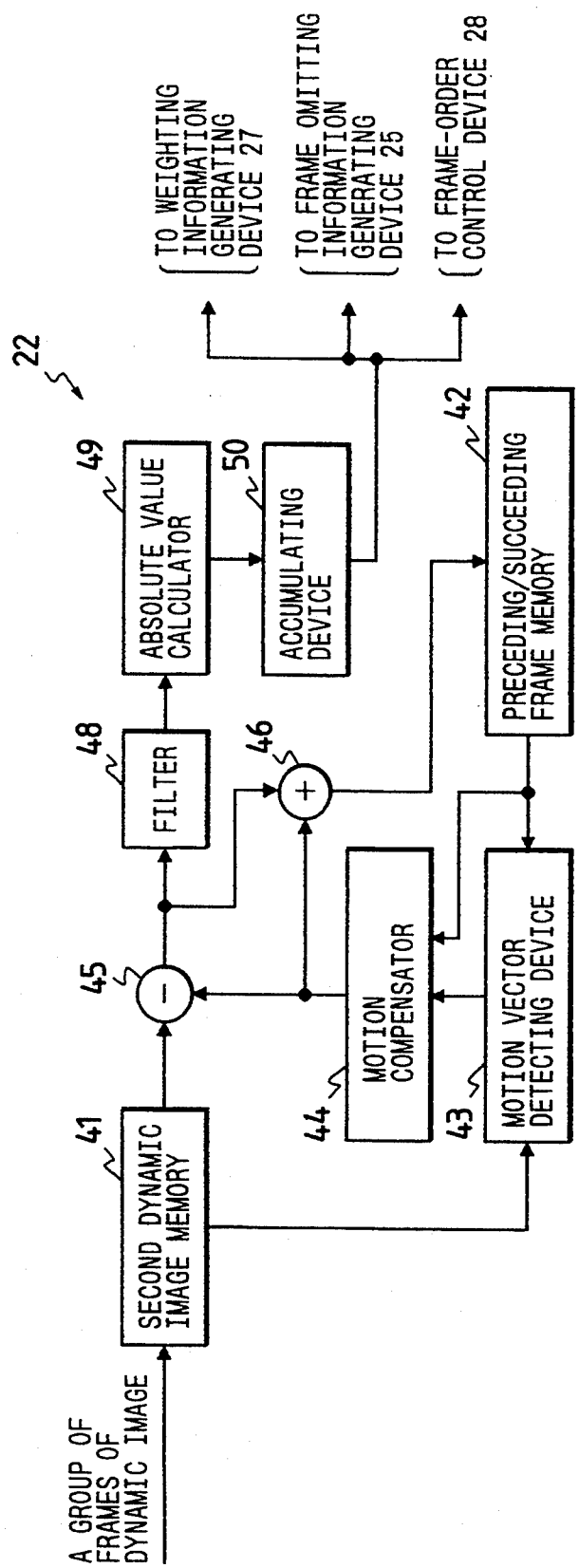
FIG. 6 is a block diagram of a prediction error accumulating device shown in FIG. 3 in which absolute values of preliminary prediction errors in an original group of frames are summed to predict the amount of codes according to the first embodiment of the present invention.

FIG. 6 is a block diagram of the prediction error accumulating device 22 in which the absolute values of the prediction errors in an original group of frames are summed to predict the amount of codes according to the first embodiment of the present invention.

As shown in FIG. 6, the prediction error accumulating device 22 comprises a second moving image memory 41 consisting of a plurality of frame memories for storing the image data of a frame in each of the frame memories, the frames being stored in original order shown in FIG. 4A, a preceding/succeeding frame memory 42 for storing the image data of a preceding frame and a succeeding frame reproduced previously, a motion vector detecting device 43 for detecting a motion vector between the preceding frame stored in the preceding/succeeding frame memory 42 and a current frame transferred from the second moving image memory 41, a motion compensator 44 for compensating the preceding frame stored in the preceding/succeeding frame memory 42 with the motion vector detected to predict the current frame, a subtracter 45 for subtracting a predicted frame obtained by compensating the preceding frame with the motion vector from the current frame stored in the second moving image memory 41 to obtain a prediction error of the current frame, and an adder 46 for reproducing the current frame by adding the prediction error to the predicted frame in the second moving image memory 41.

In the above configuration of the prediction error accumulating device 22, each of groups of frames arranged in original order shown in FIG. 4A is sequentially processed. These frames are read out one after another from the second dynamic image memory 41 in processing order shown in FIG. 4B.

In a first step, an I-frame $F_1$ is initially read out from the second moving image memory 41 as a current frame. Whenever an I-frame is processed in the prediction error accumulating device 22, a zero fill is compulsorily output from the motion compensator 44 without operating the preceding/succeeding frame memory 42 and the motion vector detecting device 43. Therefore, when an I-frame $F_1$ is transferred to the subtracter 45, the I-frame $F_1$ are output from the subtracter 45 as a prediction error $Er_1$. Thereafter, the I-frame $F_1$ is stored in the preceding/succeeding frame memory 42 through the adder 46.

In a second step, a P-frame $F_3$ is read out from the second moving image memory 41 to the motion vector detecting device 43 as a current frame. In the motion vector detecting device 43, a P-frame $F_3$ is compared with the I-frame $F_1$ stored in the preceding/succeeding frame memory 42 to detect a motion vector $Vm_1$. Thereafter, the motion vector $Vm_1$ and the I-frame $F_1$ stored in the preceding/succeeding frame memory 42 are transferred to the motion compensator 44. In the motion compensator 44, a predicted frame to the frame $F_3$ is obtained by compensating the I-frame $F_1$ with the motion vector $Vm_1$. The predicted frame is equivalent to the P-frame $F_3$ predicted. Thereafter, the predicted frame produced in the motion compensator 44 is subtracted from the P-frame $F_3$, in the subtracter 45. Therefore, a prediction error $Er_2$ of the P-frame $F_3$ is obtained from the subtracter 45. Thereafter, the prediction error $Er_2$ is added to the predicted frame in the adder 46 to reproduce the P-frame $F_3$. Thereafter, the P-frame $F_3$ reproduced is stored in the preceding/succeeding frame memory 42.

In a third step, a B-frame $F_2$ is read out from the second moving image memory 41 to the motion vector detecting device 43 and the subtracter 45 as a current frame. Also, the I-frame $F_1$ stored in the preceding/succeeding frame memory 42 is used as a preceding frame, and the P-frame $F_3$ stored in the preceding/succeeding frame memory 42 is used as a succeeding frame. In the motion vector detecting device 43, the current B-frame $F_2$ is compared respectively with the P-frame $F_3$ and the I-frame $F_1$ stored in the preceding/succeeding frame memory 42 to detect a motion vector $Vm_2$ derived from the B-frame $F_2$ and the P-frame $F_3$, and to detect a motion vector $Vm_3$ derived from the B-frame $F_2$ and the I-frame $F_1$ respectively. Thereafter, these motion vectors $Vm_2$, $Vm_3$ and the P-frame $F_3$ and the I-frame $F_1$ stored in the preceding/succeeding frame memory 42 are transferred to the motion compensator 44.

In the motion compensator 44, a predicted frame obtained by compensating the P-frame $F_3$ with the motion vector $Vm_2$ and another prediction frame obtained by compensating the I-frame $F_1$ with the motion vector $Vm_3$ are generated. As a result, two predicted errors are obtained by subtracting these predicted frames respectively from the current B-frame $F_2$ in the subtracter 45. These prediction errors are compared each other and lesser one is output as a prediction error $Er_3$. In this case, an output from the adder 46 is not stored in the preceding/succeeding frame memory 42 because any B-frame is not utilized to predict other frames.

In a fourth step, a P-frame $F_5$ is read out from the second moving image memory 41 to the motion vector detecting device 43 as a current frame, and the P-frame $F_3$ stored in the preceding/succeeding frame memory 42 is used as a preceding frame. In the motion vector detecting device 43, a P-frame $F_5$ is compared with the P-frame $F_3$ stored in the preceding/succeeding frame memory 42 to detect a motion vector $Vm_4$. Thereafter, the motion vector $Vm_4$ and the P-frame $F_3$ stored in the preceding/succeeding frame memory 42 are transferred to the motion compensator 44.

In the motion compensator 44, a predicted frame is obtained by compensating the P-frame $F_3$ with the motion vector $Vm_4$. Thereafter, the predicted frame produced in the motion compensator 44 is subtracted from the P-frame $F_5$ stored in the second moving image memory 41, in the subtracter 45, and a prediction error $Er_4$ of the P-frame $F_5$ is obtained. Thereafter, the prediction error $Er_4$ is added to the predicted frame in the adder 46 to reproduce the P-frame $F_5$. Thereafter, the P-frame $F_5$ is stored in the preceding/succeeding frame memory 42.

In a fifth step, a prediction error $Er_5$ of the B-frame $F_4$ is obtained in the same manner as the third step.

In a sixth step, an I-frame $F_7$ is read out from the second moving image memory 41 as a current frame to obtain a prediction error $Er_6$ of the I-frame $F_7$ in the same manner as the first step. In this case, an I-frame $F_7$ is substantially stored in the preceding/succeeding frame memory 42.

In a seven step, a prediction error $Er_7$ of the B-frame $F_6$ is obtained in the same manner as the third step.

In the above steps, the prediction errors $Er_1$, $Er_2$, $Er_3$, $Er_4$, $Er_5$, and $Er_7$ of a group of frames $F_1$ to $F_6$ are obtained in the prediction error accumulating device 22.

The prediction error accumulating device 22 further comprises a filter 48 for filtering out unnecessary components in the prediction errors obtained in the current frame subtracter 45, an absolute value calculator 49 for calculating absolute values of the prediction errors filtered in the filter 48, and an accumulating device 50 for accumulating the absolute values of the prediction errors calculated in the absolute value calculator 49.

In the above configuration, the sum of the prediction errors $Er_1$, $Er_2$, $Er_3$, $Er_4$, $Er_5$, and $Er_7$ is obtained in the accumulating device 50 and is transferred as an accumulated value Acc to the frame omitting information generating device 25, the weighting information generating device 27, and the frame-order control device 28 shown in FIG. 3.

In the encoding apparatus 21, coding operation is controlled by the accumulated value Acc.

In cases where the condition $Acc < Th_1$ is satisfied neither the frame omitting information generating device 25 nor the frame decimation control device 26 is operated. Here, $Th_1$ is called an original order threshold value. In contrast, the weighting information generating device 27 and the frame-order control device 28 are operated. Therefore, a series of frames Fi (i=1, 2,—) is stored in the moving image memory 24 in original order shown in FIG. 4A under the control of the frame-order control device 28, and the frames Fi are read out in groups from the memory 24 in processing order shown in FIG. 4B under the control of the frame-order control device 28. Also, a piece of weighting information informing that the weighting operation is not required is generated in the weighting information generating device 27.

In cases where the condition $Th_1 \leq Acc < Th_2$ is satisfied neither the frame omitting information generating device 25 nor the frame decimation control device 26 is operated. Here, $Th_2$ is called a modified order threshold value. In contrast, the weighting information generating device 27 and the frame-order control device 28 are operated. Therefore, a series of frames Fi is stored in the moving image memory 24 in modified order shown in FIG. 4C under the control of the frame-order control device 28, and the frames Fi are read out in groups from the memory 24 in modified processing order of frames shown in FIG. 4D under the control of the frame-order control device 28. Also, a piece of weighting information informing that the weighting operation is not required is generated in the weighting information generating device 27.

In cases where the condition $Th_2 \leq Acc < Th_3$ is satisfied, the frame omitting information generating device 25, the frame decimation control device 26, the weighting information generating device 27, and the frame-order control device 28 are operated. Here, $Th_3$ is called a decimated order threshold value. Therefore, a series of frames Fi is stored in the moving image memory 24 in slightly decimated order shown in FIG. 5A under the control of both the frame decimation control device 26 and the frame-order control device 28, and the frames Fi are read out in groups from the memory 24 in the same order under the control of the frame-order control device 28. Also, a piece of weighting information informing that the weighting operation is not required is generated in the weighting information generating device 27.

To perform the frame omitting operation under the control of the frame decimation control device 26, when one or more frames are omitted, one or more preceding frames are replaced with the omitted frames to prevent a frame frequency of codes output from the apparatus 21 from being changed. That is, the same preceding frame F1, F3, or F5 is sequentially output many times.

In cases where the condition $Th_3 \leq Acc$ is satisfied to, the frame omitting information generating device 25, the frame decimation control device 26, the weighting information generating device 27, and the frame-order control device 28 are operated together. Therefore, a series of frames Fi is stored in the moving image memory 24 in heavily decimated order shown in FIG. 5B under the control of both the frame decimation control device 26 and the frame-order control device 28, and the frames Fi are read out in groups from the memory 24 in the same order under the control of the frame-order control device 28. Also, a piece of weighting information informing that the weighting operation is required is generated in the weighting information generating device 27.

The encoding apparatus 21 further comprises a preceding/succeeding frame memory 29 for storing a preceding frame reproduced, a motion vector detecting device 30 for detecting a motion vector from the preceding frame stored in the preceding/succeeding frame memory 29 to a current frame transferred from the moving image memory 24, a motion compensator 31 for compensating the preceding frame stored in the preceding-/succeeding frame memory 29 with the motion vector detected in the motion vector detecting device 30 to predict the current frame, and a current frame subtracter 32 for subtracting a predicted frame obtained by compensating the preceding frame with the motion vector in the motion compensator 31 from the current frame stored in the moving image memory 24 to obtain a prediction error of the current frame.

In the above configuration of the encoding apparatus 21, a series of frames is transferred to the motion vector detecting device 30 and the subtracter 32. When a current frame is transferred to the motion vector detecting device 30, a motion vector is detected in the motion vector detecting device 30 and is transferred to the motion compensator 31. Thereafter, a predicted frame to the current frame is produced in the motion compensator 31, and a prediction error of the current frame is output from the subtracter 32 by subtracting the predicted frame from the current frame.

As a result, prediction errors of the frames are output from the subtracter 32 one after another in the same manner as in the prediction error accumulating device 22.

The encoding apparatus 21 further comprises an orthogonal converter 33 for orthogonally transforming the prediction error of the current frame obtained in the subtracter 32, a weighting factor generating device 34 for generating 8×8 quantization weighting factors, which are utilized for the quantization of the transformed coefficients, according to the weighting information generated in the weighting information generating device 27, a quantizer 35 for quantizing the prediction error converted in the orthogonal converter 33 with the quantization weighting factors generated in the weighting factor generating device 34, an inverse quantization device 36 for inversely quantizing the transformed coefficients quantized in the quantizer 35, an inverse orthogonal converter 37 for inversely orthogonal transforming inversely quantized coefficients in the inverse quantization device 36 into the prediction error of the current frame, an adder 38 for adding the prediction error of the current frame reproduced in the inverse orthogonal converter 37 to the predicted frame obtained in the motion compensator 31 to reproduce the current frame which is stored in the preceding/succeeding frame memory 29, a variable length encoder 39 for encoding the transformed coefficients quantized in the quantizer 35 into a predetermined code, together with additional information such as the motion vector detected in the motion vector detecting device 30 and an index which indicates the weighting factors applied in the quantizer 35, and a buffer memory 40 for temporarily storing output codes generated in the variable length encoder 39.

In the above configuration of the encoding apparatus 21, the prediction error obtained in the subtracter 32 is orthogonally transformed in tile orthogonal converter 33 and is transferred to the quantizer 35. Also, 8×8 quantization weighting factors are generated in the weighting factor generating device 34 according to the weighting information generated in the weighting information generating device 27.

FIGS. 7A, 7B respectively show an example of a matrix of 8×8 quantization weighting factors.

When a piece of weighting information informing that the weighting operation is not required is generated in the weighting information generating device 27, the weighting information is transferred to the weighting factor generating device 34, and a non-weighted matrix of 8×8 quantization weighting factors shown in FIG. 7A is generated in the weighting factor generating device 34. The quantization weighting factors shown in FIG. 7A correspond to the transformed coefficients of 8×8 pixel block. Because all of elements in the non-weighted matrix have the same value, the prediction error of the current frame is not weighted in the quantizer 35, and spatial frequency characteristics is unchanged.

In contrast, when a piece of weighting information informing that the weighting operation is required is generated in the weighting information generating device 27, the weighting information is transferred to the weighting factor generating device 34, and a weighted matrix of 8×8 quantization weighting factors shown in FIG. 7B is generated in the weighting factor generating device 34. Quantization weighting factors positioned in an upper left side correspond to lower frequency elements of the transformed coefficients, and quantization weighting factors positioned in a lower right side correspond to higher frequency elements of the transformed coefficients.

As shown in FIG. 7B, the quantization weighting factors are increased as compared with those in the non-weighted matrix shown in FIG. 7A. Generally, as the quantization weighting factor increases, a value of quantized outputs from the quantizer 35 decreases so that the amount of codes is suppressed. Therefore, in cases where the weighted matrix shown in FIG. 7B is adopted, the amount of codes decreases in exchange for deterioration in frequency characteristics of encoded images.

Generally, a viewer is sensitive to the lower frequency elements and is insensitive to the higher frequency components in a moving image.

Accordingly, the viewer senses moving images reproduced from such weighted codes clear even though the amount of codes is decreased.

After the prediction error orthogonally converted is quantized in the quantizer 35, the prediction error which is orthogonally converted and quantized is inversely quantized in the inverse quantization device 36. Thereafter, the prediction error inversely quantized is reproduced to the prediction error in the inverse orthogonal converter 37. Thereafter, the prediction error reproduced is added to the predicted moving image obtained in the motion compensator 31. Therefore, the current frame is reproduced in the adder 38. Thereafter, the current frame reproduced is stored in the preceding-/succeeding frame memory 29. Therefore, when a frame subsequent to the current frame is transferred to the motion vector detecting device 30, the current frame stored in the preceding/succeeding frame memory 29 is utilized as a preceding frame.

Also, the prediction error which is orthogonally converted and quantized in both the orthogonal converter 33 and the quantizer 35 is encoded in the variable length encoder 39, together with pieces of additional information. Therefore, a piece of output data composed of a series of codes is obtained in the variable length encoder 39. Thereafter, the output data relating to the current frame and the additional information encoded are stored in the buffer memory 40. Therefore, pieces of output data relating to a group of frames are stored one after another in the buffer memory 40.

After the output data and the additional information encoded relating to a group of six frames stored in the moving image memory 24 are temporarily stored in the buffer memory 40, the output data and the additional information encoded are output to an external device (not shown) such as a recording medium through a transmission line (not shown). Thereafter, the output data are decoded in a decoder (not shown) to reproduce a series of frames while referring the additional information to determine a decoding method.

Accordingly, in cases where the accumulated value Acc obtained in the prediction error accumulating device 22 is small (Acc<$Th_1$), it is predicted in the device 22 that the amount of codes obtained by encoding prediction errors of a group of frames stored in the moving image memory 24 in original order shown in FIG. 4A is small enough to encode the prediction errors in the encoding apparatus 21. In this case, the reduction of the amount of codes is not required because the prediction errors are sufficiently small. Therefore, a group of frames can be distinctly reproduced because the frames are predicted with high accuracy.

Also, in cases where the accumulated value Acc obtained in the prediction error accumulating device 22 is increased in some degree ($Th_1 \leq$Acc<$Th_2$), it is predicted in the device 22 that the amount of codes obtained by encoding prediction errors of a group of frames stored in the moving image memory 24 is too large to encode the prediction errors in the moving image encoding apparatus 21. In this case, because a group of frames arranged in modified order shown in FIG. 4C consists of a small number of P-frames and a large number of B-frames as compared with those arranged in original order shown in Fig. 4A, the amount of codes relating to the frames arranged in modified order shown in FIG. 4C is smaller than that relating to the frames arranged in original order shown in FIG. 4A.

Therefore, the frames stored in the moving image memory 24 are arranged in modified order shown in FIG. 4C under the control of the frame-order control device 28 to reduce the amount of codes. As a result, the amount of codes obtained by encoding prediction errors of a group of frames becomes small enough to encode the prediction errors in the moving image encoding apparatus 21. Accordingly, a group of frames can be reproduced as distinct as possible in the apparatus 21.

Also, in cases where the accumulated value Acc obtained in the prediction error accumulating device 22 is moreover increased ($Th_2 \leq$Acc<$Th_3$), it is predicted in the device 22 that the amount of codes obtained by encoding prediction errors of a group of frames stored in the moving image memory 24 is too large to encode the prediction errors in the moving image encoding apparatus 21 even though the frames are arranged in modified order shown in FIG. 4C. In this case, because the frames $F_2$, $F_4$, and $F_6$ are omitted in the frames arranged in slightly decimated order shown in FIG. 5A, the amount of codes relating to the frames arranged in slightly decimated order shown in FIG. 5A is considerably smaller than that relating to the frames arranged in original order shown in FIG. 4A.

Therefore, the frames stored in the moving image memory 24 are arranged in slightly decimated order shown in FIG. 5A according to the frame omitting operation under the control of the frame decimation control device 26 to reduce the amount of codes. As a result, the amount of codes obtained by encoding prediction errors of a group of frames becomes small enough to encode the prediction errors in the moving image encoding apparatus 21. Accordingly, a group of frames can be reproduced as distinct as possible in the apparatus 21.

Also, in cases where the accumulated value Acc obtained in the prediction error accumulating device 22 is moreover increased ($Th_3 \leq$Acc), it is predicted in the device 22 that the amount of codes obtained by encoding prediction errors of a group of frames stored in the moving image memory 24 is too large to encode the prediction errors in the moving image encoding apparatus 21 even though the frames are arranged in slightly decimated order shown in FIG. 5A. In this case, because the frames $F_2$, $F_3$, $F_5$ and $F_6$ are omitted in the frames arranged in heavily decimated order shown in FIG. 5B, the amount of codes relating to the frames arranged in heavily decimated order shown in FIG. 5B is smaller than that relating to the frames arranged in slightly decimated order shown in FIG. 5A.

Therefore, the frames stored in the moving image memory 24 are arranged in heavily decimated order shown in FIG. 5B according to the frame omitting operation under the control of the frame decimation control device 26 to reduce the amount of codes. In addition, the quantization of the prediction errors is performed in the quantizer 35 with the weighted matrix of quantization weighting factors shown in FIG. 7B according to the weighting operation to greatly reduce the amount of codes. As a result, the amount of codes obtained by encoding prediction errors of a group of frames becomes small enough to encode the prediction errors in the moving image encoding apparatus 21. Accordingly, a group of frames can be reproduced as distinct as possible in the apparatus 21.

Next, a second embodiment of the present invention is described.

In the second embodiment, five types of operations are performed in the encoding apparatus 21 in connection with the accumulated value Acc output from the prediction error accumulating device 22, according to the second embodiment. A first to third types of operations in the second embodiment is the same as those in the first embodiment.

A fourth type of operation in the second embodiment is performed on condition that the accumulated value Acc is smaller than a fourth threshold value $Th_4$ ($Th_3 \leq Acc < Th_4$). In the fourth type of operation according to the second embodiment, the frame omitting operation is performed, and a series of frames arranged in modified order shown in FIG. 4C is processed.

A fifth type of operation in the second embodiment is performed on condition that the accumulated value Acc is equal to or larger than the fourth threshold value $Th_4$ ($Th_4 \leq Acc$). In the fifth type of operation according to the second embodiment, the frame omitting operation and the weighting operation is performed, and a series of frames arranged in modified order shown in FIG. 4C is processed, in the same manner as in the fourth type of operation according to the first embodiment.

In cases where the condition $Th_3 \leq Acc < Th_4$ is satisfied to perform the fourth type of operation in the second embodiment, the frame omitting information generating device 25, the frame decimation control device 26, the weighting information generating device 27, and the frame-order control device 28 are operated. Therefore, a series of frames Fi is stored in the moving image memory 24 in heavily decimated order of frames shown in FIG. 5B under the control of both the frame decimation control device 26 and the frame-order control device 28, and the frames Fi are read out from the memory 24 in the same order under the control of the frame-order control device 28. Also, a piece of weighting information informing that the weighting operation is not required is generated in the weighting information generating device 27.

Accordingly, in cases where the accumulated value Acc obtained in the prediction error accumulating device 22 is moreover increased ($Th_3 \leq Acc < Th_4$), it is predicted in the device 22 that the amount of codes obtained by encoding prediction errors of a group of frames stored in the moving image memory 24 is too large to encode the prediction errors in the moving image encoding apparatus 21 even though the frame omitting operation is performed under the control of the frame decimation control device 26. In this case, because the amount of codes relating to the frames arranged in modified order shown in FIG. 4C is smaller than that relating to the frames arranged in original order shown in FIG. 4A, the frames stored in the moving image memory 24 are arranged in modified order shown in FIG. 4C under the control of the frame-order control device 28 to reduce the amount of codes, in addition to the frame omitting operation. As a result, the amount of codes obtained by encoding prediction errors of a group of frames becomes small enough to encode the prediction errors in the encoding apparatus 21. Accordingly, a group of frames can be reproduced as distinct as possible in the apparatus 21.

In the first and second embodiments, in cases where one or more frames are omitted from a series of frames stored in the moving image memory 24, the omitted frames are replaced with a frame preceding the omitted frames as shown in FIGS. 5A, 5B to prevent a frequency of the output data stored in the buffer memory 39 from being varied. However, in cases where the frequency of the output data is allowed to be varied, as shown in FIG. 8, it is preferred that one or more frames are omitted without replacing the omitted frames with any frame.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. A method for encoding a plurality of prediction errors of a group of frames of moving images, comprising the steps of:

calculating preliminary prediction errors of an original group of frames arranged in original order, a frame of moving image existing in each of the frames, and each of the preliminary prediction errors being defined as a difference between a frame of moving image actually produced and a frame of moving image predicted;

accumulating the preliminary prediction errors of the original group of frames to obtain an accumulated value;

omitting one or more frames from the original group of frames to produce a decimated group of frames arranged in decimated order in cases where the accumulated value is larger than a modified order threshold value $Th_2$;

calculating prediction errors of the decimated group of frames, each of the prediction errors of the decimated group of frames being defined as a difference between a frame of moving image actually produced and a frame of moving image predicted, and the sum of the prediction errors of the decimated group of frames being smaller than the modified order threshold value $Th_2$; and encoding the prediction errors of the decimated group of frames to produce pieces of output data of which each are composed of a plurality of codes, the amount of the codes of the output data being lower than an upper limit, and the decimated group of frames of moving images being reproduced by decoding the codes of the output data.

2. A method according to claim 1, additionally including:

weighting quantization weighting factors in cases where the accumulated value is larger than a decimated order threshold value $Th_3$, the decimated order threshold value $Th_3$ being larger than the modified order threshold value $Th_2$; and quantizing the prediction errors of the decimated group of frames with the quantization weighting factors, prior to the step of encoding the prediction errors, the amount of codes obtained by encoding the prediction errors quantized with the quantization weighting factors being smaller than the amount of codes obtained by encoding the prediction errors quantized without the quantization weighting factors.

3. A method according to claim 1 in which the step of omitting one or more frames includes:
   replacing the frames omitted with a frame preceding the frames omitted to equalize the number of frames in the decimated group to the number of frames in the original group.

4. A method according to claim 1 in which the step of omitting one or more frames includes:
   replacing the frames omitted with a frame succeeding the frames omitted to equalize the number of frames in the decimated group to the number of frames in the original group.

5. A method according to claim 2 in which the step of weighting quantization weighting factors includes:
   heavily weighting the quantization weighting factors, relating to higher frequency elements to which a viewer is insensitive, on priority basis; and
   slightly weighting the quantization weighting factors relating to lower frequency elements to which a viewer is sensitive.

6. A method for encoding a plurality of prediction errors of a group of frames, comprising the steps of:
   preparing an original group of frames composed of one or more I-frames, one or more P-frames, and one or more B-frames, a frame of moving image existing in each of the I-, P- and B-frames, an I-frame of moving image being not predicted with any frame, a P-frame of moving image being predicted with an I-frame or another P-frame of moving image preceding the P-frame of moving image, and a B-frame of moving image being predicted with both an I-frame or a P-frame of moving image preceding the B-frame of moving image and an I-frame or a P-frame of moving image succeeding the B-frame of moving image;
   preparing a modified group of frames composed of one or more I-frames, one or more P-frames, and one or more B-frames, the number of B-frames being increased while decreasing the number of P-frames as compared with the original group of frames, and the number of the modified group of frames being equal to the number of the original group of frames;
   preparing a slightly decimated group of frames which is produced by slightly omitting one or more frames from the original group of frames and replacing each of the frames omitted with a frame preceding or succeeding the frames omitted;
   preparing a heavily decimated group of frames which is produced by heavily omitting a plurality of frames from the modified group of frames and replacing the frames omitted with a frame preceding or succeeding the frames omitted;
   calculating preliminary prediction errors of the original group of frames arranged in original order, each of the preliminary prediction errors being defined as a difference between a frame of moving image actually produced and a frame of moving image predicted;
   accumulating the preliminary prediction errors of the original group of frames to obtain an accumulated value;
   calculating first prediction errors of the original group of frames in cases where the accumulated value is smaller than an original order threshold value The, each of the first prediction errors of the original group of frames being defined as a difference between a frame of moving image actually produced and a frame of moving image predicted;
   calculating second prediction errors of the modified group of frames in cases where the accumulated value ranges between the original order threshold value $Th_m$ and a modified order threshold value $Th_2$ larger than the original order threshold value $Th_1$, each of the second prediction errors of the modified group of frames being defined as a difference between a frame of moving image actually produced and a frame of moving image predicted;
   calculating third prediction errors of the slightly decimated group of frames in cases where the accumulated value ranges between the modified order threshold value $Th_2$ and a decimated order threshold value $Th_3$ larger than the modified order threshold value $Th_2$, each of the third prediction errors of the slightly decimated group of frames being defined as a difference between a frame of moving image actually produced and a frame of moving image predicted;
   calculating fourth prediction errors of the heavily decimated group of frames in cases where the accumulated value is larger than the decimated order threshold value $Th_3$, each of the fourth prediction errors of the heavily decimated group of frames being defined as a difference between a frame of moving image actually produced and a frame of moving image predicted; and
   encoding the first prediction errors, the second prediction errors, the third prediction errors or the fourth prediction errors to produce pieces of output data of which each are composed of a plurality of codes, the amount of the codes of the output data being lower than an upper limit, and one group of frames of moving images selected from among the original group of frames of moving images, the modified group of frames of moving images, the slightly decimated group of frames of moving images, and the heavily decimated group of frames of moving images being reproduced by decoding the codes of the output data.

7. A method according to claim 6, additionally including:
   weighting quantization weighting factors in cases where the accumulated value is larger than the decimated order threshold value $Th_3$; and
   quantizing the fourth prediction errors of the heavily decimated group of frames with the quantization weighting factors, prior to the step of encoding the prediction errors, the amount of codes obtained by encoding the fourth prediction errors of the heavily decimated group of frames quantized with the quantization weighting factors being smaller than the amount of codes obtained by encoding the fourth prediction errors of the heavily decimated group of frames quantized without the quantization weighting factors.

8. A method according to claim 7 in which the step of weighting quantization weighting factors includes:
   heavily weighting the quantization weighting factors, relating to higher frequency elements to which a viewer is insensitive, on priority basis; and
   slightly weighting the quantization weighting factors relating to lower frequency elements to which a viewer is sensitive.

9. A method for encoding successive frames of moving images, in which the successive frames are divided into groups consisting of a predetermined number of frames, the method comprising the step of:

calculating inter-frame prediction errors which each are derived from a difference between a current frame belonging to a current group of an original order and a reference frame adjacent to the current frame;

calculating a sum of the inter-frame prediction errors before the frames belonging to the current group are encoded;

comparing the sum of the inter-frame prediction errors with a modified order threshold level $Th_2$;

reconstituting a new current group of frames by omitting at least one frame from the current group in cases where the sum exceeds the modified order threshold level $Th_2$; and respectively encoding frames belonging to the new current group.

10. A method according to claim 9, in which the step of respectively encoding frames includes:

calculating inter-frame prediction errors which each are derived from a difference between a new current frame belonging to the new current group and a reference frame adjacent to the new current frame;

orthogonally transforming the inter-frame prediction errors calculated into transformed coefficients using discrete cosine transform;

quantizing the transformed coefficients into digital data by first weighting factors; and converting the digital data into predetermined codes.

11. A method according to claim 9, in which the step of respectively encoding frames includes:

comparing the sum with a decimated order threshold level $Th_3$ which is larger than the modified order threshold level $Th_2$;

calculating inter-frame prediction errors which each are derived from a differences between a new current frame belonging to the new current group and a reference frame adjacent to the new current frame;

orthogonally transforming the inter-frame prediction errors calculated into transformed coefficients using discrete cosine transform;

quantizing the transformed coefficients into digital data by second weighting factors in cases where the sum exceeds the decimated order threshold level $Th_3$; and converting the digital data into predetermined codes.

12. A moving image encoding apparatus, comprising:

prediction error accumulating means for accumulating preliminary prediction errors of an original group of frames of an original or to obtain an accumulated value, a frame of moving image existing in each of the frames, and each of the preliminary prediction errors being defined as a difference between a frame of moving image actually produced and a frame of moving image predicted;

frames omitting information generating means for generating a piece of frame omitting information in cases where the accumulated value obtained in the prediction error accumulating means is larger than a modified order threshold value $Th_2$;

moving image memory means for storing a decimated group of frames of moving images according to the frame omitting information generated in the frame omitting information generating means, the decimated group of frames being produced by omitting one or more frames from the original group of frames utilized in the prediction error accumulating means;

prediction error calculating means for calculating prediction errors of the decimated group of frames of moving images stored in the moving image memory means, each of the prediction errors being defined as a difference between a frame of moving image actually produced and a frame of moving image predicted; and encoding means for encoding the prediction errors of the decimated group of frames calculated in the prediction error calculating means to produce prediction error codes, the amount of the prediction error codes being smaller than an upper limit, and the decimated group of frames of moving images being reproduced by decoding the prediction error codes.

13. An apparatus according to claim 12, additionally including:

weighting information generating means for generating a piece of weighting information in cases where the accumulated value obtained in the prediction error accumulating means is larger than a decimated order threshold value $Th_3$, the decimated order threshold value $Th_3$ being larger than the modified order threshold value $Th_2$;

weighting factor generating means for generating quantization weighting factors according to the weighting information generated in the weighting information generating means; and quantizing means for quantizing the prediction errors of the decimated group of frames with the quantization weighting factors generated in the weighting factor generating means, prior to the encoding of the prediction errors in the encoding means, the amount of codes obtained by encoding the prediction errors quantized with the quantization weighting factors being smaller than the amount of codes obtained by encoding the prediction errors quantized without the quantization weighting factors.

* * * * *